US009602049B2

(12) United States Patent
Urabe et al.

(10) Patent No.: US 9,602,049 B2
(45) Date of Patent: Mar. 21, 2017

(54) OPERATING POINT CONTROL CIRCUIT DEVICE FOR SERIES-CONNECTED PHOTOVOLTAIC CELLS OR OTHER ELECTRIC SOURCES

(71) Applicants: Shinichi Urabe, Shizuoka-ken (JP); Toshihisa Shimizu, Fuchu (JP)

(72) Inventors: Shinichi Urabe, Shizuoka-ken (JP); Toshihisa Shimizu, Fuchu (JP)

(73) Assignees: Toyota Jidosha Kabushiki Kaisha, Toyota-shi (JP); Tokyo Metropolitan University, Tokyo (JP)

( * ) Notice: Subject to any disclaimer, the term of this patent is extended or adjusted under 35 U.S.C. 154(b) by 0 days.

(21) Appl. No.: 15/139,453

(22) Filed: Apr. 27, 2016

(65) Prior Publication Data

US 2016/0322931 A1    Nov. 3, 2016

(30) Foreign Application Priority Data

Apr. 28, 2015  (JP) .................................. 2015-92148
Apr. 19, 2016  (JP) .................................. 2016-83307

(51) Int. Cl.
*H02S 40/34*    (2014.01)
*H02J 7/35*    (2006.01)
*H02J 3/38*    (2006.01)

(52) U.S. Cl.
CPC .............. *H02S 40/34* (2014.12); *H02J 3/383* (2013.01); *H02J 7/35* (2013.01)

(58) Field of Classification Search
CPC ... H02J 3/383; H02J 7/35; H02J 15/00; H02S 40/34; H01F 6/00; Y02E 10/566; Y02E 10/766; Y02E 70/30

(Continued)

(56) References Cited

U.S. PATENT DOCUMENTS 9,431,825 B2 *  8/2016  Arditi ....................... H02J 1/10
2015/0234122 A1 *  8/2015  Andle .................. G02B 6/1228
257/432

FOREIGN PATENT DOCUMENTS

JP    H06-284601 A    10/1994

OTHER PUBLICATIONS

Toshihisa Shimizu et al., "Improvement of the Efficiency Characteristics on the Photovoltaic Generation System based on a Generation Control Circuit", Proceedings of JSES/JWEA Joint Conference (1996), pp. 57-60.

(Continued)

*Primary Examiner* — Jared Fureman
*Assistant Examiner* — Swarna N Chowdhuri
(74) *Attorney, Agent, or Firm* — Dinsmore & Shohl LLP (57) ABSTRACT

In a circuit device controlling an operating point of each of two or more series-connected photovoltaic cells or other power supply cells in a module, the output voltage of the module can be boosted without reducing the generated electric power. The operating point control circuit device includes capacitors connected in parallel to the respective series-connected cells, switching elements connected in parallel to the respective series-connected cells through an inductor, an additional capacitor connected in series to the capacitor row, and an additional switching element connected in series to the switching element row. The switching elements are controlled to shut off electrical conduction between the corresponding terminals connected thereto in the same predetermined cycle and in mutually different periods so as to always establish a condition that one switching element is in the non-conductive state and the others are is in the conductive state.

8 Claims, 7 Drawing Sheets

(58) Field of Classification Search
USPC .......................................................... 307/78
See application file for complete search history.

(56) References Cited

OTHER PUBLICATIONS

Toshihisa Shimizu, "Generation Control Circuitry for Operating Point Normalization of Photovoltaic Modules", FB Technical News No. 56 (Nov. 1, 2000), pp. 22-27.
Toshihisa Shimizu et al., "Generation Control Circuit for Photovoltaic Modules", IEEE Transactions on Power Electronics, vol. 16, No. 3 (May 2001), pp. 293-300.

* cited by examiner

OPERATING POINT CONTROL CIRCUIT DEVICE FOR SERIES-CONNECTED PHOTOVOLTAIC CELLS OR OTHER ELECTRIC SOURCES

CROSS-REFERENCE TO RELATED APPLICATIONS

The present disclosure claims priority to Japanese Patent Application No. 2015-92148 filed Apr. 28, 2015 and Japanese Patent Application No. 2016-083307 filed Apr. 19, 2016, which are incorporated herein by reference in their entirety including the specifications, drawings, and abstracts.

TECHNICAL FIELD

The present disclosure relates to an operating point control circuit device for photovoltaic cells (solar cells) and other arbitrary electric sources (batteries, condensers, fuel cells, electric generators, power generation elements, etc.), and more specifically to an operating point control circuit device for series-connected photovoltaic cells or other electric sources, having a structure that enables controlling the generated voltage or operating voltage of each of the cells, batteries or electric sources together with boosting their output voltages

BACKGROUND ART

The generated voltage of one photovoltaic cell is generally lower than operating voltages of various machinery and appliance and chargers, and thus, in one way of using the photovoltaic cell for operating a machinery and appliance or charging a charger, there is employed a structure in which two or more photovoltaic cells are series-connected (photovoltaic or solar cell module) in a solar energy power generation system. In such a photovoltaic cell module in which two or more photovoltaic cells are series-connected, when a shadow is casted on some cells due to differences in the installation angles of the respective photovoltaic cells and/or a building, etc., causing variations in received light amounts in the respective photovoltaic cells, a cell whose generated electric power is smaller becomes a resistor (an inversely biased diode), which can cause the reduction of the output of the photovoltaic cell module.

Figure 7A:
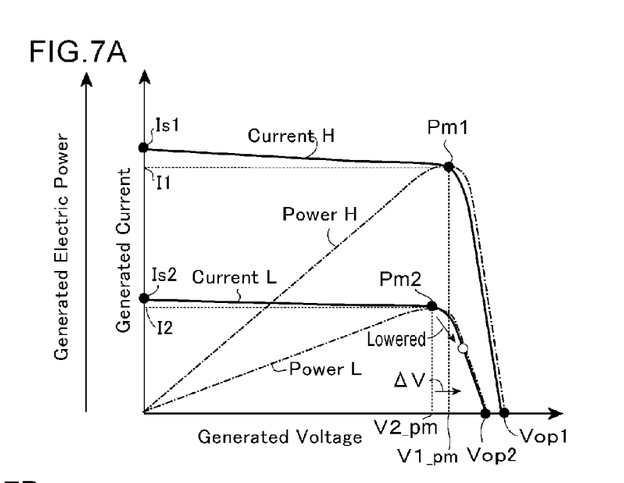
FIG. 7A schematically shows characteristics in changes of a generated current and a generated electric power to a generated voltage of a photovoltaic cell.

More concretely, as well known in this field, the photovoltaic cell has a characteristic that its current changes together with the increase of its generated voltage from 0V, and there is the optimal operating point at which the generated power becomes its maximum (referred to as the maximum electric power point or the optimal operating point.) as illustrated in FIG. 7A. And, in a case of a photovoltaic cell module in which two or more photovoltaic cells are connected in series as mentioned above, it is presumed that the maximum output points of all the photovoltaic cells are substantially coincident with one another so that the current at the common maximum output point will flow through all the series-connected photovoltaic cells. However, actually, the received light amounts in some photovoltaic cells in a photovoltaic cell module can be decreased due to a shadow, etc. and in that case, the power generation characteristic of only the photovoltaic cell of which the received light amount is reduced changes in the direction that the current to the generated voltage is lowered so that its maximum output point will shift. Then, in the circuit configuration where photovoltaic cells are connected in series, the same current will flow through photovoltaic cells having mutually different maximum output points, and thus, when the current is adjusted for the maximum output point of a cell receiving the larger light amount, the cell receiving the smaller light amount (the cell of a small power generation amount) not only generates substantially no power, but also it becomes a resistance against the current, causing the output reduction of the photovoltaic cell module. (Not only a power generation output corresponding to the received light amount in the photovoltaic cell module could not be obtained, but also the output loss would be caused.).

Then, for a device for avoiding such an output reduction due to differences of the received light amounts among the photovoltaic cells, there has been proposed a power generation operating point control circuit device capable of controlling individually an operating point of each of series-connected photovoltaic cells (Non-patent documents 1-3). This power generation operating point control circuit device employs a multistage voltage step up/down chopper circuit for a circuit configuration where two or more photovoltaic cells are connected in series, and controls a generated voltage in each photovoltaic cell so as to make a current at the maximum output point of each photovoltaic cell flow therethrough, thereby enabling all the photovoltaic cells to generates electric power substantially at the respective maximum output point. According to this power generation operating point control circuit device, even a photovoltaic cell of which the received light amount is reduced due to a shadow, etc. can be made to operate at its maximum output point, and therefore, the generated power corresponding to the received light amount of the photovoltaic cell module can be obtained, and also, since a photovoltaic cell of which the received light amount is reduced does not become a inversely biased diode, the output loss will also be reduced.

In this regard, with respect to the structure using a chopper circuit in the operational control of a photovoltaic cell, patent document 1 proposes an example of a circuit configuration which is capable of charging the power generation output of a photovoltaic cell into a charger efficiently by reducing the loss in a switching element.

PRIOR TECHNICAL DOCUMENTS

Patent Documents

Patent document 1: JP H06-284601

Non-Patent Documents

Non-patent document 1: Toshihisa Shimizu, et al., Proceedings of JSES/JWEA Joint Conference 1996, pages 57-60
Non-patent document 2: Toshihisa Shimizu, FB technical news, Nov. 1, 2000, No. 56, pages 22-27
Non-patent document 3: Toshihisa Shimizu, et al., "Generation Control Circuit for Photovoltaic Modules", IEEE TRANSACTIONS ON POWER ELECTRONICS, VOL. 16, NO. 3, May 2001, pages 293-300

SUMMARY

Technical Problem

In a photovoltaic cell module in which two or more photovoltaic cells are connected in series, the output voltage between the opposite ends of the photovoltaic cell module obtained in use of a power generation operating point control circuit device described in the above-mentioned non-patent documents 1-3 can be rendered to be substantially the total of the voltages generated by the respective photovoltaic cells at the respective maximum electric power point. Thus, when a voltage higher than the total of the generated voltages of two or more series-connected photovoltaic cells is required, for example, in a case of charging a charger which should be charged at a voltage higher than the total of the generated voltages of photovoltaic cells, it is necessary to boost up the output voltage of the photovoltaic cell module. However, the power generation operating point control circuit device proposed in the non-patent documents 1-3 is not equipped with a voltage step-up (boosting) function, and thus, if it is tried to boost up the output voltage of the photovoltaic cell module, its generated power would be reduced. Therefore, in the case of the above-mentioned power generation operating point control circuit device, in order to obtain a voltage higher than the output voltage of the photovoltaic cell module, a booster device is required additionally, and in that case, the size of the system becomes large and its cost will increase.

In this respect, the inventors of the present disclosure have found out that it is possible to boost the output voltage of a photovoltaic cell module without reducing its generated output power, by modifying only a part of configuration of the above-mentioned power generation operating point control circuit device. This knowledge is used in the present disclosure.

Thus, one of objects of the present disclosure is to provide a power generation operating point control circuit device for controlling the power generation operating point of each photovoltaic cell in a photovoltaic cell module in which two or more photovoltaic cells are connected in series, which device can raise the output voltage of the photovoltaic cell module without reducing its generated output power.

In addition, the structure of the device to which the function of boosting the output voltage of a photovoltaic cell module is provided by modifying a part of the structure of the power generation operating point control circuit device as described above can also be used in a module in which two or more arbitrary power supply elements, such as batteries, electric condensers, electric generators, power generation elements, etc., are connected in series for controlling an operating voltage of each of the batteries and/or electric condensers. Thus, a further object of the present disclosure is to provide an operating point control circuit device for controlling the operating point of each cell in a module in which two or more photovoltaic cells, power supply elements (battery cells, condenser cells, electric generators, power generation elements, etc.) are connected in series, which device can raise the output voltage of the module without reducing its generated power or output power.

Solution to Problem

According to the present disclosure, the above-mentioned object is achieved by an electric power generation operating point control circuit device for two or more series-connected photovoltaic cells, comprising:
  a pair of output terminals,
  two or more electrode connecting terminals connected to respective electrode terminals of two or more photovoltaic cells connected in series between the pair of the output terminals,
  a capacitor connected in parallel to each of the two or more photovoltaic cells through the corresponding electrode connecting terminals between the pair of the output terminals;
  a switching element connected in parallel to each of the two or more photovoltaic cells through a pair of the corresponding electrode connecting terminals and an inductor between the pair of the output terminals, and the switching element selectively making the pair of the corresponding electrode connecting terminals connected thereto electrically conductive with each other;
  an additional capacitor connected in series to the capacitors between the pair of the output terminals, the additional capacitor being connected between one of the electrode connecting terminals at one side end of the two or more series-connected photovoltaic cells and one of the output terminals, or between two of the electrode connecting terminals between two adjoined photovoltaic cells of the series-connected two or more photovoltaic cells; and
  an additional switching element connected in parallel to the additional capacitor and connected in series to the switching elements between the pair of the output terminals;
  wherein the switching elements and the additional switching elements are controlled to operate such that the switching elements and the additional switching elements shut off electrical conduction between the corresponding terminals connected thereto among between the pairs of the electrode connecting terminals, between the one of the electrode connecting terminal and the one of the output terminals, and between the two of the electrode connecting terminals, in a same predetermined cycle time and in mutually different periods, to always establish a condition that either one of the switching elements and the additional switching elements shuts off the electrical conduction between the corresponding terminals connected thereto while the others of the switching elements and the additional switching elements make the corresponding terminals connected thereto electrically conductive with each other.

As understood from explanations mentioned later with reference to the drawings, the device of the present disclosure basically has a circuit configuration similar to a power generation operating point control circuit device employing a multistage step up/down chopper circuit for two or more series-connected photovoltaic cells, as described in non-patent documents 1-3. However, in the case of the device of the present disclosure, as noted above, a circuit portion in which an additional capacitor and an additional switching element are connected in parallel with each other is further added between one end of the multistage step up/down chopper circuit (the circuit comprising photovoltaic cells, capacitors, inductors and switching elements), and one of the output terminals or between the stages in the multistage step up/down chopper circuit. And in the operations, as noted above, the electrical conductions of the switching elements and additional switching element are controlled such that these switching elements each shut off electrical conductions between the corresponding terminals connected thereto among between the pairs of the electrode connecting terminals, between one of the electrode connecting terminals and one of the output terminals, and between two of the electrode connecting terminals connected to two adjoined photovoltaic cells in the same predetermined cycle time and in mutually different periods, and also, always, either one of the switching elements and additional switching elements shuts off electrical conductions between the corresponding terminals connected thereto among between the pairs of the electrode connecting terminals, between one of the electrode connecting terminals and one of the output terminals and between two of the electrode connecting terminals connected to two adjoining photovoltaic cells.

According to the structure of the above-mentioned circuit configuration, because of the existence of the circuit portion in which the additional capacitor and switching element are connected in parallel, it becomes possible to render the output voltage between the pair of the output terminals to be a value higher than the total of the generated voltages of the two or more photovoltaic cells in the case that all the photovoltaic cells generate electric power at the respective maximum operating point without reducing the generated electric power. Namely, in the structure of the above-mentioned circuit configuration, it becomes possible to raise the voltage between the output terminals without additionally connecting a booster (circuit or device) to the output terminals.

In this respect, more in detail, as already noted, a photovoltaic cell generally has the characteristic that its current changes with its generated voltage as shown in FIG. 7A, and thus, in operation of a photovoltaic cell, the output voltage (namely, the generated voltage) between the terminals of the photovoltaic cell is adjusted, using a voltage or current controller performing Maximum Power Point Tracking: MPPT, such as an MPPT controller. Namely, briefly speaking, the output voltage between terminals of a photovoltaic cell is controlled to a voltage set by a voltage or current controller, such as an MPPT controller, and in a case of a photovoltaic cell module in which photovoltaic cells are series-connected, the output voltage between the opposite terminals of the photovoltaic cell module is controlled by a voltage or current controller. In that case, in a circuit configuration in which photovoltaic cells are series-connected, in general, the output loss could be caused by an occurrence of a difference in the maximum electric power points of the photovoltaic cells owing to a difference in their received light amounts, etc. as already noted, but it becomes possible to adjust the generated voltage of each photovoltaic cell individually by means of the power generation operating point control circuit device (non-patent documents 1-3) as described above, and therefore, in regulation of a voltage of an MPPT controller, etc. or the output voltage of both terminals of a photovoltaic cell module by a current controller, the condition that all the series-connected photovoltaic cells generate electric power at the respective maximum electric power points can be realized. However, even in a case that the power generation operating point control circuit device in non-patent documents 1-3 is used, if the output voltage between terminals of a photovoltaic cell module is set to a value higher than the total of the generated voltages at the respective maximum electric power points of the respective photovoltaic cells therein, the generated voltage of at least one photovoltaic cell would shift from the value at its maximum electric power point so that the generated electric power would be reduced.

On the other hand, in the structure of the device of the present disclosure, namely, in the case of the structure that a circuit portion in which an additional capacitor and switching element are connected in parallel is added between the output terminals of a power generation operating point control circuit device in the non-patent documents 1-3, when the output voltage adjusted by a voltage or current controller, such as an MPPT controller, is higher than the total of the generated voltages of the series-connected photovoltaic cells at the respective maximum electric power points, it becomes possible to make the additional capacitor hold the voltage difference between the output voltage adjusted by the voltage or current controller and the total of the generated voltages of the photovoltaic cells at the respective maximum electric power points. Thereby, there can be realized a condition that each photovoltaic cell performs a power generation operation at each maximum electric power point while the output voltage of the both terminals of the photovoltaic cell module is held at a voltage higher than the total of the generated voltages of the photovoltaic cells at the respective maximum electric power points. And also, since each photovoltaic cell performs the power generation operation at its maximum electric power point, a condition with substantially no generated electric power reduction can be established.

In the above-mentioned structure, the circuit configuration is, so called, a step up/down chopper circuit, in which the generated voltages of the respective photovoltaic cells and the holding voltage of the additional capacitor are adjusted by the respective switching elements and additional switching element periodically repeating the switching of the respective state between the conductive and non-conductive states, and the height of each of the voltages is determined by the ratio of the time width in which the electrical conduction is shut off in the corresponding switching element or additional switching element to the predetermined cycle time (OFF time duty ratio). And, as explained in the column of Embodiments mentioned later, the OFF time duty ratio of each switching element is the ratio of the generated voltage of the corresponding photovoltaic cell or the holding voltage of the additional capacitor (the voltage difference obtained by deducting the total of the generated voltages of the photovoltaic cells from the output voltage between the pair of the output terminals) to the output voltage between the opposite output terminals of the photovoltaic cell module. Thus, in the structure of the above-mentioned device of the present disclosure, the electrical conduction and the shutting-off of electrical conduction in each of the switching elements and additional switching element may be controlled such that a ratio of a time width of each of the switching elements shutting off the electrical conduction between the corresponding pair of the electrode connecting terminals to the predetermined cycle time is a ratio of a (required or suitable) generated voltage of the corresponding photovoltaic cell of each of the switching elements to an output voltage between the pair of the output terminals; and, when the output voltage between the pair of the output terminals is higher than a total of the generated voltages of the series-connected photovoltaic cells, a ratio of a time width of the additional switching element shutting off the electrical conduction between the corresponding terminals connected thereto to the predetermined cycle time is adjusted to a ratio of a voltage difference, obtained by deducting the total of the generated voltages of the series-connected photovoltaic cells from the output voltage between the pair of the output terminals, to the output voltage between the pair of the output terminals.

In this regard, as understood from the above-mentioned explanations, the generated electric power which can be taken out from a photovoltaic cell module becomes its maximum when each photovoltaic cell generates electric power at its maximum electric power point. Thus, in the above-mentioned device of the present disclosure, the output voltage between the pair of the output terminals may be a desired voltage, and the ratio of the time width of each of the switching elements shutting off the electrical conduction between the corresponding pair of the electrode connecting terminals to the predetermined cycle time may be so adjusted that the generated voltage of the photovoltaic cell corresponding to each of the switching elements will become a voltage at a maximum operating point of the corresponding photovoltaic cell.

Moreover, generally, in a solar energy power generation system, when the environmental condition of photovoltaic cells, for example, such as their received light amounts and the temperature, changes, in some embodiments the generated voltage of a photovoltaic cell can be adjusted in real time according to the change, and in many cases, a voltage or current controller, such as an MPPT controller, is designed to monitor the generated electric power of a photovoltaic cell successively and regulate its generated voltage. Similarly to this, in some embodiments the generated voltage of each photovoltaic cell in the photovoltaic cell module can be successively adjusted. As noted, the generated voltage of each photovoltaic cell is adjusted with the ratio of the time width of the shutting off of the electrical conduction between the pair of the electrode connecting terminals connected to the corresponding one of the switching elements connected in parallel to the predetermined cycle time. Thus, in some embodiments an adjuster may be further provided, the adjuster adjusts the ratio of the time width of each of the switching elements shutting off the electrical conduction between the corresponding pair of the electrode connecting terminals to the predetermined cycle time so that the generated voltage of each of the series-connected photovoltaic cells will become a voltage at the maximum operating point of the each of the photovoltaic cell. Such an adjuster may be designed to appropriately change the ratio of the time width of the shutting off of the electrical conduction between the pair of electrode connecting terminals connected to each switching element to the predetermined cycle time so that the generated electric power becomes its maximum based on the change of the generated electric power monitored in the voltage or current controller which adjusts the output voltage between the pair of the output terminals, such as an MPPT controller.

By the way, when a plurality of the devices of the present disclosure are prepared and connected in parallel, much larger current will be obtained. Thus, in another manner of the present disclosure, there may be provided a device in which pairs of the output terminals of a plurality of the devices as mentioned above are mutually connected in parallel.

Moreover, the circuit configuration of the above-mentioned device of the present disclosure can be used for a module in which rechargeable batteries (chemical cells), condenser cells, fuel cells, generators, power generation elements, or other arbitrary elements outputting electric power, other than photovoltaic cell, are connected in series (Hereinafter, arbitrary elements outputting electric power, including photovoltaic cells, are called "power supply cells".), or a module in which a photovoltaic cell, a chemical cell, a condenser cell and/or any other power supply cell coexist while being connected in series, where the power generation and/or electric discharge operation in the module can be performed while adjusting the operating voltage of each cell. Thus, in a further other manner of the present disclosure, at least one of the photovoltaic cells may be replaced to (a) chemical battery cell(s) or (a) condenser cell(s) in the circuit configuration of the above-mentioned device of the present disclosure.

Then, according to another manner of the present disclosure, there is provided an operating point control circuit device for two or more series-connected power supply cells, comprising:
a pair of output terminals,
two or more electrode connecting terminals connected to respective electrode terminals of two or more power supply cells connected in series between the pair of the output terminals,
a capacitor connected in parallel to each of the two or more power supply cells through the corresponding electrode connecting terminals between the pair of the output terminals;
a switching element connected in parallel to each of the two or more power supply cells through a pair of the corresponding electrode connecting terminals and an inductor between the pair of the output terminals, and the switching element selectively making the pair of the corresponding electrode connecting terminals connected thereto electrically conductive with each other;
an additional capacitor connected in series to the capacitors between the pair of the output terminals, the additional capacitor being connected between one of the electrode connecting terminals at one side end of the two or more series-connected power supply cells and one of the output terminals, or between two of the electrode connecting terminals between two adjoined power supply cells of the two or more series-connected power supply cells; and
an additional switching element connected in parallel to the additional capacitor and connected in series to the switching elements between the pair of the output terminals;
wherein the switching elements and the additional switching elements are controlled to operate such that the switching elements and the additional switching elements shut off electrical conduction between the corresponding terminals connected thereto among between the pairs of the electrode connecting terminals, between the one of the electrode connecting terminal and the one of the output terminals and between the two of the electrode connecting terminals in a same predetermined cycle time and in mutually different periods to always establish a condition that either one of the switching elements and the additional switching elements shuts off the electrical conduction between the corresponding terminals connected thereto while the others of the switching elements and the additional switching elements make the corresponding terminals connected thereto electrically conductive with each other. The structure of the operational control of the above-mentioned operating point control circuit device applied to arbitrary power supply cells may be similar to those in the case of the power generation operating point control circuit device for photovoltaic cells. Further, with respect to the device in which at least one of the photovoltaic cells is replaced to (a) chemical battery cell(s) or (a) condenser cell(s) and the operating point control circuit device applied to arbitrary power supply cells, also, a plurality of the devices may be prepared and mutually connected in parallel. Thus, there may be provided a device in which pairs of the output terminals of a plurality of the devices, in which at least one of the photovoltaic cells may be replaced to (a) chemical battery cell(s) or (a) condenser cell(s), or the operating point control circuit devices applied to power supply cells are mutually connected in parallel.

Effect of Present Disclosure

Thus, according to the above-mentioned device of the present disclosure, as noted, it becomes possible to raise or boost the output voltage of a photovoltaic cell module in which two or more photovoltaic cells are connected in series without reducing its generated electric power.

Therefore, in a case that a machine or a charger which is wanted to operate requests, in accordance with its specification, a higher voltage than the total of the generated voltages when two or more photovoltaic cells are operating in the respective maximum electric power points, there is no need to prepare a booster additionally, and thus, the increase of the size or cost of the system can be avoided.

By the way, briefly speaking, the circuit configuration of the above-mentioned device of the present disclosure is similar to a configuration in which one photovoltaic cell is removed in the power generation operating point control circuit device of non-patent documents 1-3. As already noted, in the case of the power generation operating point control circuit device of non-patent documents 1-3, since photovoltaic cells are connected to all the stages of a multistage step up/down chopper circuit, when the voltage between the opposite terminals of the step up/down chopper circuit is not equal to the total of the generated voltages when all the photovoltaic cells generate power at the respective maximum electric power point, the generated voltage of either one of the photovoltaic cells will shift from the value at its maximum electric power point, and in that case, the generated electric power of that one photovoltaic cell is reduced so that the whole generated electric power obtained by the photovoltaic cell module will also be reduced. For example, in a photovoltaic cell module in which n of photovoltaic cells are series-connected, when the output voltage of the photovoltaic cell module is not equal to the total of the generated voltages when the n photovoltaic cells generate power at the respective maximum electric power point, the electric power to be generated by the n photovoltaic cells cannot be obtained. On the other hand, in the case of the present disclosure, even when the voltage between the opposite terminals of the step up/down chopper circuit becomes higher than the total of the generated voltages when all the photovoltaic cells generate power at the respective maximum electric power points, its voltage difference is held by an additional capacitor so that all the photovoltaic cells can generate power at the respective maximum electric power points. For example, for a photovoltaic cell module in which n of photovoltaic cells are series-connected, a step up/down chopper circuit having the structure of n+1 steps is prepared. In this case, even when the output voltage of the photovoltaic cell module is higher than the total of the generated voltages of the n photovoltaic cells generating power at the respective maximum electric power points, the condition that all of the n photovoltaic cells performs the power generation at the respective maximum electric power points, so that the electric power of the n photovoltaic cells can be obtained. In other words, according to the structure of the present disclosure, the output voltage higher than the total of the generated voltages when all the photovoltaic cells generate power at the respective maximum electric power points can be obtained without reducing the electric power obtained from all the electric generating capacity of the prepared photovoltaic cells, and therefore, all the photovoltaic cells can be used effectively while increases of the size and cost of a photovoltaic cell module will be suppressed. Also when the device of the present disclosure is applied to arbitrary power supply cells, the similar operational effects can be obtained, depending on the operational characteristics of power supply cells.

Other purposes and advantages of the present disclosure will become clear by explanations of the following embodiments of the present disclosure.

EXPLANATIONS OF REFERENCE NUMERALS

PV1-PV6—Photovoltaic cell
M1-M7—Switching element (MOSFET)
C1-C7—Capacitor
L1-L6—Inductor
S1-S7—Control input
ct—Electrode connecting terminal
Bt1-Bt6—Rechargeable battery cell (chemical cell)
Cond1-Cond2—Condenser cell

DESCRIPTIONS OF EMBODIMENTS

In the followings, embodiments of the present disclosure are described in detail. In the drawings, the same references indicate the same sites.

Structure of Operating Point Control Circuit Device

Figure 1A:
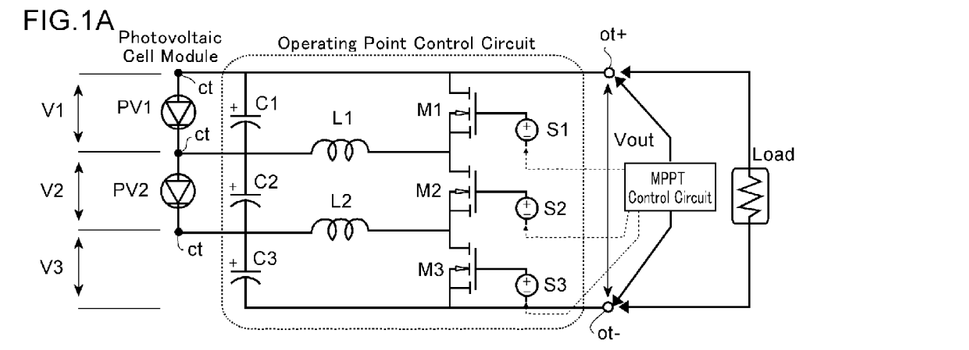
FIG. 1A shows an exemplary circuit configuration diagram of one embodiment of the power generation operating point control circuit device in accordance with the present disclosure.
Figure 1B:
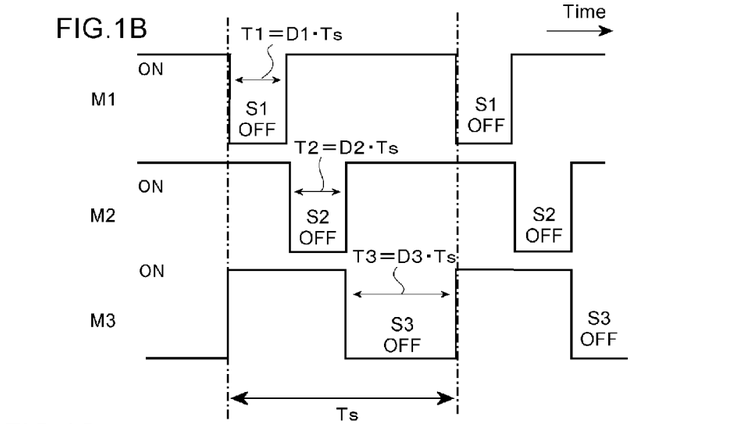
FIG. 1B shows an exemplary time chart of the ON/OFF state of a switching element.
Figure 1C:
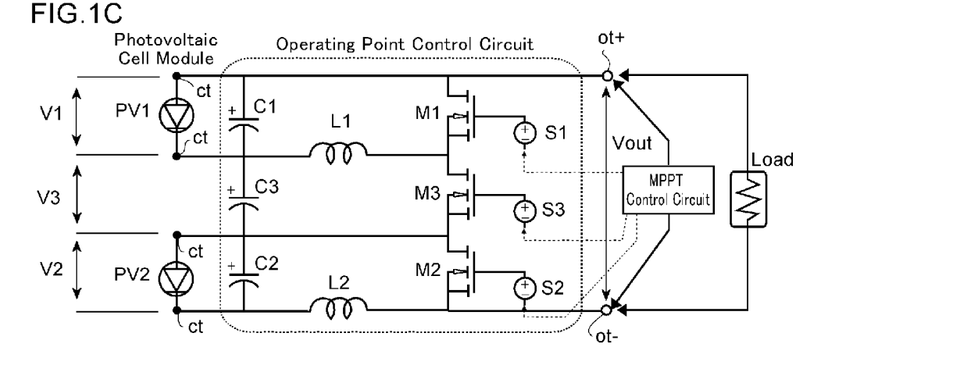
FIG. 1C shows an exemplary circuit configuration diagram of another embodiment of the power generation operating point control circuit device in accordance with the present disclosure, in which an additional capacitor and an additional switching element are inserted between two stages of a multistage step up/down chopper circuit.

The circuit configuration of a power generation operating point control circuit device for photovoltaic cells in accordance with the present disclosure is basically similar to that of a multistage step up/down chopper circuit described in non-patent documents 1-3. Concretely, with reference to FIG. 1A, for example, when two photovoltaic cells PV1 and PV2 are connected in series, capacitors C1 and C2 and switching elements M1 and M2 are connected in parallel to the two photovoltaic cells PV1 and PV2 connected in series (through electrode connecting terminals ct) between a pair of output terminals ot+ and ot−, respectively, and inductors L1 and L2 are inserted between the corresponding electrode terminals ct of the photovoltaic cells PV1 and PV2 and the corresponding terminals of the switching elements M1 and M2, respectively. However, in the case of the circuit configuration according to the present disclosure, further, a capacitor C3 is added in series to the capacitor row and a switching element M3 is added to the switching element row between the photovoltaic cell row and output terminal ot− in the above-mentioned circuit configuration. In this circuit configuration, one stage chopper circuit consists of a circuit formed with a set of a photovoltaic cell, a capacitor, an inductor and a switching element, and thus, it can be said briefly that, when n of photovoltaic cells are connected in series, the circuit of the present disclosure comprises n+1 stages of chopper circuits, in which no photovoltaic cell is put in one stage of the chopper circuits (Thus, for example, when three photovoltaic cells are series-connected, four steps of chopper circuits will be used.). In this regard, the additional capacitor C3 and additional switching element M3, as mentioned above, may be provided between the stages of photovoltaic cells PV1 and PV2 as shown in FIG. 1C, and further, a plurality of the circuits of the additional capacitor and switching element may be provided in the circuit configuration of the power generation operating point control circuit device (That is, when n photovoltaic cells are connected in series, n+m stages of chopper circuits (m is a positive integer) may be used.). It should be understood that such a case belongs to the scope of the present disclosure, also.

In the above-mentioned structure, the switching elements M1, M2, and M3 may be, typically, a switching element, such as MOSFET, usually used in the power generation operating point control circuit device for a photovoltaic cell. The switching elements M1, M2 and M3 have the control inputs S1, S2 and S3, respectively, and selectively conduct or shut off between the corresponding upper and lower terminals in the drawing, namely, between the opposite terminals of the corresponding photovoltaic cell (PV1, PV2) and capacitor (C1, C2, C3) connected in parallel, in accordance with the input signals of control inputs S1, S2, and S3. The capacitors and inductors may be arbitrary elements ordinarily used in this field.

Further, in an actual use of the power generation operating point control circuit device, a load, for example, an arbitrary machinery and appliance, a device, a charger, etc. is connected between the output terminal ot+ and ot−, and together with this, there is connected between the output terminal ot+ and ot−, an MPPT control circuit or an arbitrary other voltage/current controller which controls voltage Vout between the output terminals. The voltage/current controller is designed to hold the output voltage between output terminals at a voltage requested or desired in the load, and further provide to the control inputs S1, S2 and S3, control signals for selectively conducting or shutting off between the corresponding terminals in order to adjust the generated voltage of each photovoltaic cell PV1 and PV2 (Thus, in the present embodiment, the voltage/current controller performs the functions of the adjuster for the duty ratios for the switching elements as explained later.). The MPPT control circuit or arbitrary other voltage/current controller may be a circuit or a controller having a structure of arbitrary type known in the field of the electric generation control of photovoltaic cells. Further, the load may be connected to the operating point control circuit device through the MPPT control circuit or arbitrary other voltage/current controller.

Operation of Operating Point Control Circuit Device

In the operation of the above-mentioned power generation operating point control circuit device to which the present disclosure is applied, basically, as already noted, the electrical conduction states [conductive state (ON)/non-conductive state (OFF)] of the switching elements are controlled for adjusting the generated voltages (V1, V2) of the photovoltaic cells (PV1, PV2) connected between the output terminals while the output voltage Vout between the output terminal ot+/ot− is held. This device is so called a multistage voltage step-up chopper circuit as mentioned below, and the heights of the generated voltages of the respective photovoltaic cells are arbitrarily controllable by changing the ratios of time widths of the ON/OFF state to the switching cycle time of the switching elements. However, a photovoltaic cell has the characteristic that a generated electric power changes with a generated voltage where the maximum electric power point exists, and thus, when it is tried to effectively use the electric generating ability of each photovoltaic cell, it is required to render the output voltage between the output terminals to be substantially equal to the total of the generated voltages of the respective photovoltaic cell at the respective maximum electric power point. In that case, when the voltage requested by the load is higher than the output voltage between the output terminals, i.e., the total of the generated voltages of the respective photovoltaic cells at the respective maximum electric power points, a booster would be required to be used additionally.

In this respect, the inventors of the present disclosure have found out that, in the circuit configuration of the above-mentioned power generation operating point control circuit device, only by adding a circuit portion in which a capacitor and a switching element are connected in parallel between the output terminals, in other words, only by forming n+1 stages of step up/down chopper circuits as the circuit configuration of the power generation operating point control circuit device for n of photovoltaic cells being connected in series while connecting no photovoltaic cell into one stage of the n+1 stages, as explained in conjunction with FIG. 1A, it becomes possible to make all the photovoltaic cells generate power at the respective maximum electric power points and also render the output voltage between the output terminals to be higher than the total of the generated voltages of all the photovoltaic cells at the respective maximum electric power points.

In the following, the principle of the control of the power generation operating point control circuit device and its operation are explained.

(1) The Principle of the Generated Voltage Control of the Power Generation Operating Point Control Circuit Device (Non-Patent Documents 1-3)

Referring to FIG. 7A, as already noted, a photovoltaic cell generally has the characteristic that its current (solid line) changes to its generated voltage as illustrated, and in the change of the generated electric power (alternate long and short dash line), there exist the maximum electric power point (Pm1, Pm2) when the generated electric power becomes its maximum value.

These current-voltage characteristic and power-voltage characteristic of the photovoltaic cell change with environmental conditions of the photovoltaic cell, and thus, for example, when the received light amount decreases due to a shadow, etc., there occurs a phenomenon that the characteristic curve designated with current H changes to the characteristic curve designated with the current L in the direction that the current is lowered, and thus the characteristic curve designated with the electric power H also changes to the characteristic curve designated with the electric power L as seen in the drawing.

In a case that photovoltaic cells having a current/voltage characteristic as described above are connected in series, when any gap of the current/voltage characteristic curves arises among the photovoltaic cells owing to any cause, e.g., that some photovoltaic cells are covered in a shade, a difference in currents at the maximum electric power points occurs among the photovoltaic cells, and thus, in a case of a structure that the same current flows through all the series-connected photovoltaic cells, some photovoltaic cells cannot be made to generate power at their maximum electric power points. Then, the electric power obtained in that condition will be decreased lower than the maximum electric power to be obtained corresponding to the received light amounts in all the photovoltaic cells. Thus, in order to make all series-connected photovoltaic cells perform power generation operation at the respective maximum electric power points, a power generation operating point control circuit device in which a voltage step-up chopper circuit is connected to each photovoltaic cell is used as illustrated in FIG. 7B, where the generated voltage and current are adjusted for each photovoltaic cell (non-patent document 1-3).

Figure 7B:
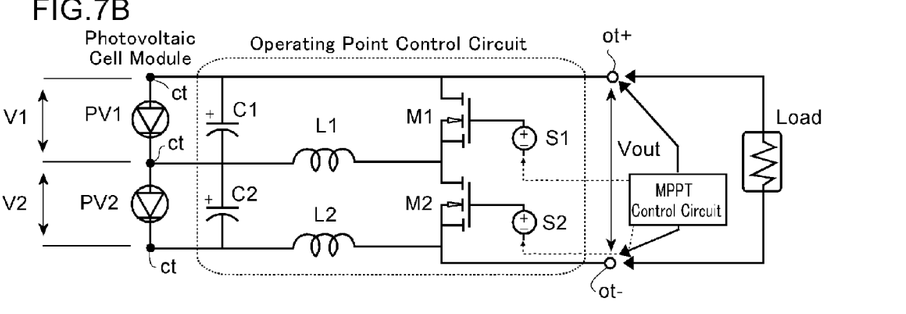
FIG. 7B is a diagram showing an exemplary circuit configuration of the power generation operating point control circuit device described in Non-patent documents 1-3.
Figure 7C:
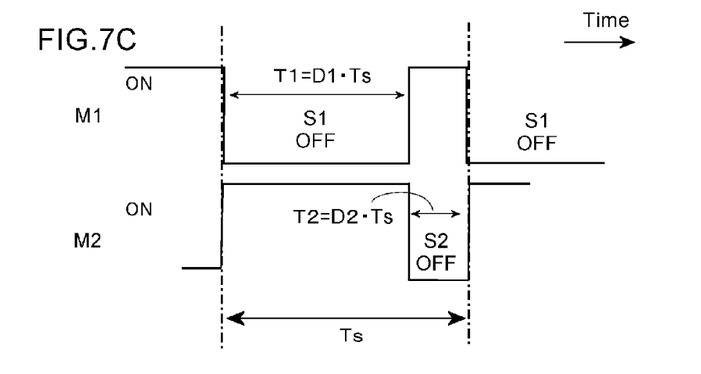
FIG. 7C shows an exemplary time chart of the ON/OFF state of switching elements in the circuit configuration of FIG. 7B.

Referring to FIG. 7B, in the operation of the above-mentioned power generation operating point control circuit device, first, the voltage between the opposite terminals of series-connected photovoltaic cells PV1 and PV2, i.e., the output voltage of a power generation operating point control circuit device, is adjusted by load, MPPT control circuit, etc., and the generated voltages V1 and V2 of the respective photovoltaic cells PV1 and PV2, are determined by the ratios of the time widths of the ON state and OFF state, i.e., the conductive state and non-conductive state of the switching elements M1 and M2. The switching elements M1 and M2 each carry out the switching between the ON state and OFF state in the predetermined cycle time Ts as illustrated in FIG. 7C, and in the control of the switching elements, either one is always in the OFF state while the other(s) is(are) always in the ON state. In that case, in the illustrated voltage step-up chopper circuit, the following relation, represented with OFF time duty ratios D1 and D2, i.e. the ratios of time widths of the OFF states to the predetermined cycle time Ts of the respective switching elements (hereinafter, referred to as "duty ratio"), is established between the voltages V1 and V2 of the photovoltaic cells and the output voltage Vout:

$$V_{out} = V1 + V2 \quad (1a)$$

$$V1 = D1 \cdot V_{out} \quad (1b)$$

$$V2 = D2 \cdot V_{out} \quad (1c)$$

Namely, $D1 + D2 = 1$.

In this regard, it should be understood here that the value of Vout, D1, and D2 can be arbitrarily set within the allowable limits of the respective elements.

Thus, in the illustrated circuit, when the output voltage Vout is equal to the total of the generated voltages of all the photovoltaic cells at the respective maximum electric power points, namely, when the following relation is established:

$$V_{out} = V1\_pm + V2\_pm \quad (2a)$$

($V1\_pm$ and $V2\_pm$ each are the generated voltages of the photovoltaic cells at the respective maximum electric power points), if the duty ratios D1 and D2 are adjusted as follows:

$$D1 = V1\_pm / V_{out} \quad (2b)$$

$$D2 = V2\_pm / V_{out} \quad (2c),$$

all the photovoltaic cells generate power at the generated voltages at the respective maximum electric power points, and thus, the maximum electric power to be obtained corresponding to the received light amounts of all the photovoltaic cells can be obtained. In this regard, in the above-mentioned circuit, in the actual setting of the values of Vout, D1 and D2, the MPPT control circuit monitors the voltage and current between the output terminals and measures the generated electric power while changing Vout, D1, and D2, and thereby the conditions of Vout, D1 and D2 giving the maximum electric power will be determined and used.

By the way, in a case that the output voltage Vout is larger than the total of the generated voltages of all the photovoltaic cells at the respective maximum electric power points (it is possible to set such a condition by regulation of the load, the MPPT control circuit, etc.), namely, in a case of a condition:

$$V_{out} = V1\_pm + V2\_pm + \Delta V \quad (3a),$$

the relations (1a)-(1c) are established, and thus, for example, when the condition (2b) is established, namely, when $$V1 = V1\_pm = D1 \cdot V_{out} \quad (3b)$$

is established, V2 will be determined as $$V2 = V2\_pm + \Delta V = D2 \cdot V_{out} \quad (3c).$$

That is, in this case, the generated voltage of the photovoltaic cell PV2 will shift from the generated voltage $V2\_pm$ at its maximum electric power point. Then, for example, as understood with reference to the characteristic curve of electric power L in FIG. 7A, the generated electric power of the photovoltaic cell PV2 will be lowered together with a gap ΔV of V2 as compared with the case of the maximum electric power point (The operating point moves from the position of the black spot to the position of the white spot).

That is, in a structure that all the voltage step-up chopper circuits are equipped with the photovoltaic cells as shown in FIG. 7B, in order to make all the photovoltaic cells generate at the respective maximum electric power points to obtain the maximum electric power corresponding to received light amounts when the requested output voltage is larger than the total of the generated voltages of all the photovoltaic cells at the respective maximum electric power points, it is needed to install additionally a voltage booster between the output terminal ot+ and ot−.

(2) Improvement of Generated Voltage Control by Power Generation Operating Point Control Circuit Device according to the Present Disclosure On the other hand, in the present disclosure, as noted, by adding a capacitor and a switching element into the circuit configuration of the above-mentioned power generation operating point control circuit device, even when the requested output voltage is larger than the total of the generated voltages of all the photovoltaic cells at the respective maximum electric power points, it becomes possible to realize the condition that all the photovoltaic cells generate power at the respective maximum electric power points.

Concretely, referring to FIG. 1A again, the circuit configuration of the power generation operating point control circuit device according to the present disclosure is a structure that one stage to which no photovoltaic cell is connected is added to the multistage voltage step-up chopper circuit of FIG. 7B. In this structure, although no element having a power generation ability in itself exists in the stage to which no photovoltaic cell is connected, capacitor C3 can accumulate electric charge so that voltage can be held thereon, and thus, when there occurs a difference between the output voltage Vout and the voltage (V1+V2) of the stages to which the photovoltaic cells are connected, this voltage difference will be held by the capacitor C3. Thus, in the structure of FIG. 1A, since one switching element is added, the switching elements M1, M2 and M3 each carry out the switching between the ON state and OFF state in the predetermined cycle time Ts as illustrated in FIG. 1B, and in the control of the switching elements, either one is always in the OFF state while the other(s) is(are) always in the ON state. In that case, in the illustrated voltage step-up chopper circuit, the following relation, represented with duty ratios D1, D2 and D3, is established between the voltages V1, V2 and V3 of the respective stages in the voltage step-up chopper circuit and the output voltage Vout:

$$Vout=V1+V2+V3 \quad (4a)$$

$$V1=D1 \cdot Vout \quad (4b)$$

$$V2=D2 \cdot Vout \quad (4c)$$

$$V3=D3 \cdot Vout \quad (4d)$$

$$\text{Namely, } D1+D2+D3=1 \quad (4e)$$

Also in the above-mentioned circuit, the values of Vout, D1, D2 and D3 can be set arbitrarily within the allowable limit of each element and the relations (4a)-(4d) are always established. Therefore, first, when the output voltage Vout is equal to the total of the generated voltages of all the photovoltaic cells at the respective maximum electric power points, namely, when the following relation is established:

$$Vout=V1\_pm+V2\_pm \quad (5a)$$

if the duty ratios D1, D2 and D3 are adjusted as follows:

$$D1=V1\_pm/Vout \quad (5b)$$

$$D2=V2\_pm/Vout \quad (5c)$$

$$D3=0/Vout \quad (5d)$$

The condition that all the photovoltaic cells generate power at the generated voltages at the respective maximum electric power points is realized. Further, when the output voltage Vout is made larger than the total of the generated voltages of all the photovoltaic cells at the respective maximum electric power points, namely, when there is established:

$$Vout=VL\_pm+V2\_pm+\Delta V \quad (6a),$$

since the duty ratios D1 and D2 can be set arbitrarily within the range that the relation (4e) is satisfied, it is possible to adjust D1, D2 and D3 to be:

$$D1=V1\_pm/Vout \quad (5b)$$

$$D2=V2\_pm/Vout \quad (5c)$$

$$D3=\Delta V/Vout \quad (5d)$$

Namely, as noted, in the case of the circuit configuration of FIG. 1A, since it becomes possible to make the capacitor C3 hold ΔV, the condition that all the photovoltaic cells generate power at the generated voltages at the respective maximum electric power points can be realized as in Expressions (5b) and (5c).

Figure 2A:
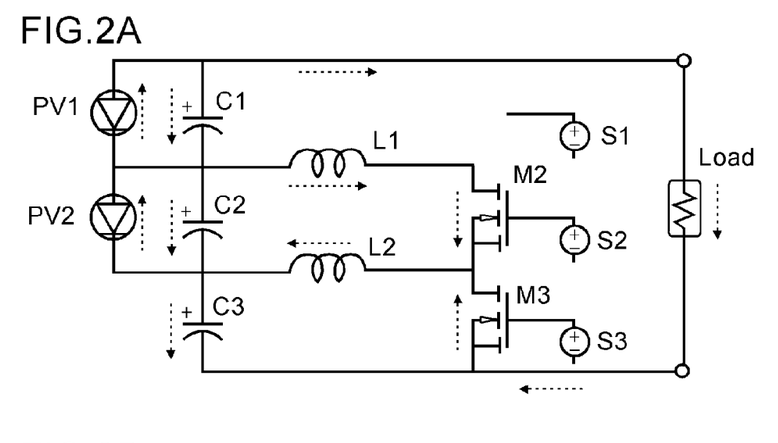
FIG. 2A is a diagram showing current flows in conditions that the respective switching elements are in the OFF state in the circuit configuration of FIG. 1A, in which the dotted line arrows indicate the directions of current flows.
Figure 2B:
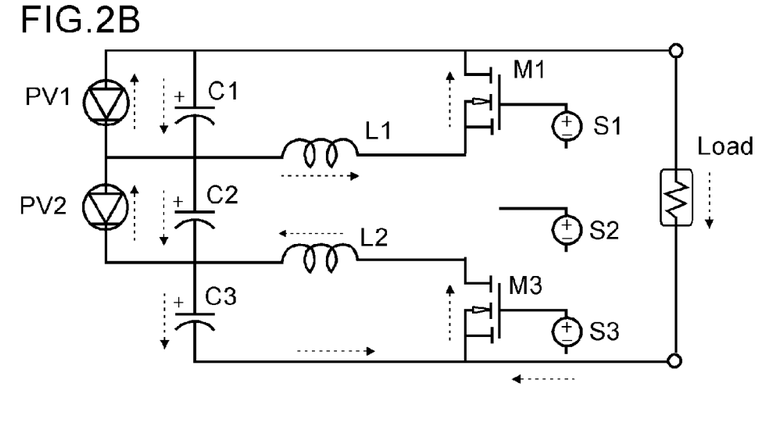
FIG. 2B is another diagram showing current flows in conditions that the respective switching elements are in the OFF state in the circuit configuration of FIG. 1A, in which the dotted line arrows indicate the directions of current flows.
Figure 2C:
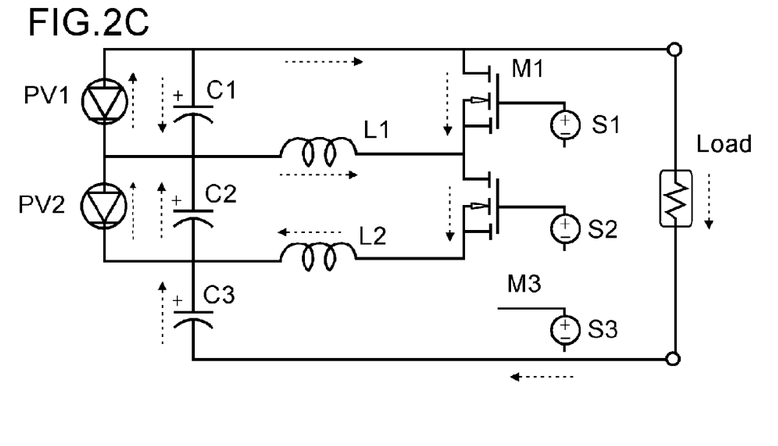
FIG. 2C is still another diagram showing current flows in conditions that the respective switching elements are in the OFF state in the circuit configuration of FIG. 1A, in which the dotted line arrows indicate the directions of current flows.

In this regard, electric charges for the capacitor C3 to hold ΔV are given by the current flow from the inductor during the switching of the ON/OFF state by the switching element. With reference to FIGS. 2A, 2B, and 2C, in the current flows in the switching element operations, when the corresponding switch element is in the ON state, a current flows from the inductor in the other stages into the capacitor C3, and when the corresponding switch element is in the OFF state, the current flows out of the capacitor C3. In these processes, since the output voltage is kept at Vout, the voltage of the capacitor C3, in its time average, becomes the voltage obtained by deducting the total of the generated voltages of the photovoltaic cells from the output voltage Vout.

Thus, in the above-mentioned power generation operating point control circuit device according to the present disclosure, when the output voltage Vout is larger than the total of the generated voltages of all the photovoltaic cells at the respective maximum electric power points, this voltage difference is held by the capacitor C3, and therefore, as noted above, even when the requested output voltage is larger than the total of the generated voltages of all the photovoltaic cells at the respective maximum electric power points, the condition that all the photovoltaic cells are made to generate power at the respective maximum electric power points can be realized, and accordingly, it becomes possible to make all the photovoltaic cells perform power generation at the respective maximum electric power points and obtain the maximum electric power corresponding to the received light amounts. In this regard, in the circuit of the above, in the actual setting of the values D1, D2 and D3, the MPPT control circuit holds Vout at an arbitrary value and monitors the voltage and current between the output terminals and measures the generated electric power while changing Vout, D1, D2 and D3, and thereby the conditions of D1, D2 and D3 giving the maximum electric power will be determined and used.

Figure 3:
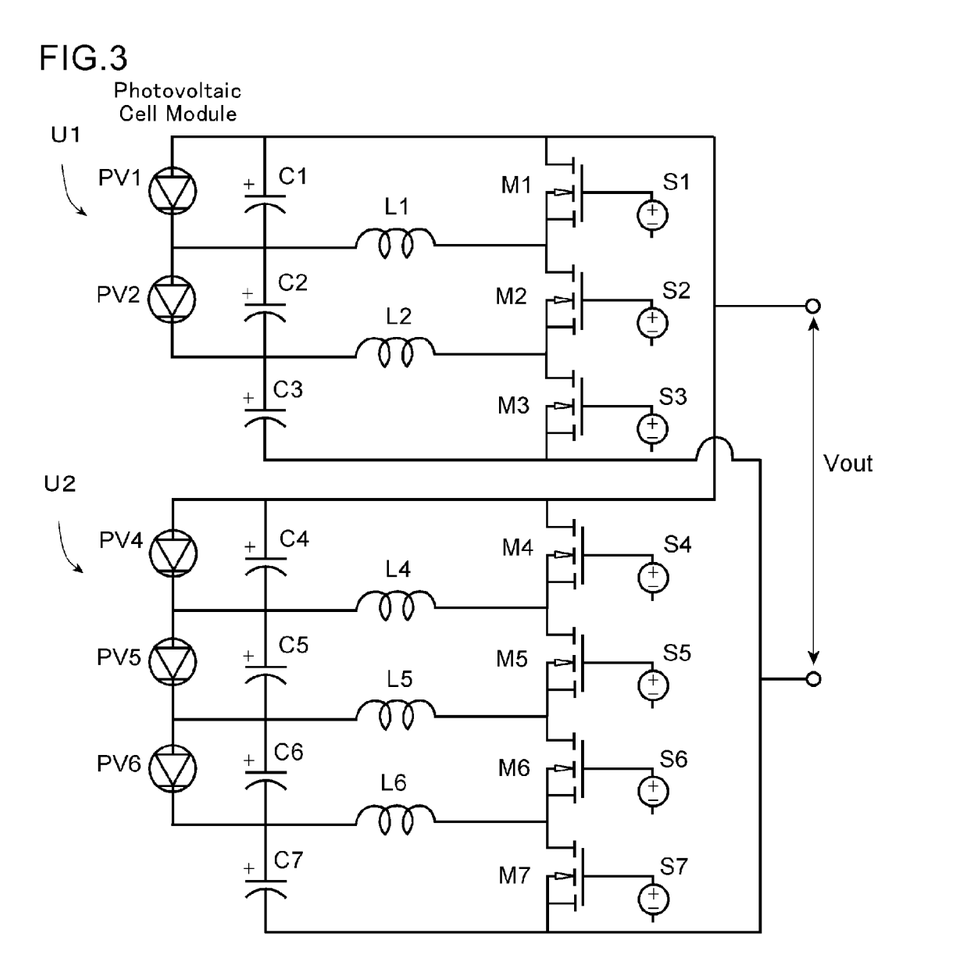
FIG. 3 shows a diagram of a circuit configuration in which two of the circuit configurations (units) shown in FIG. 1A are connected in parallel.
Figure 4A:
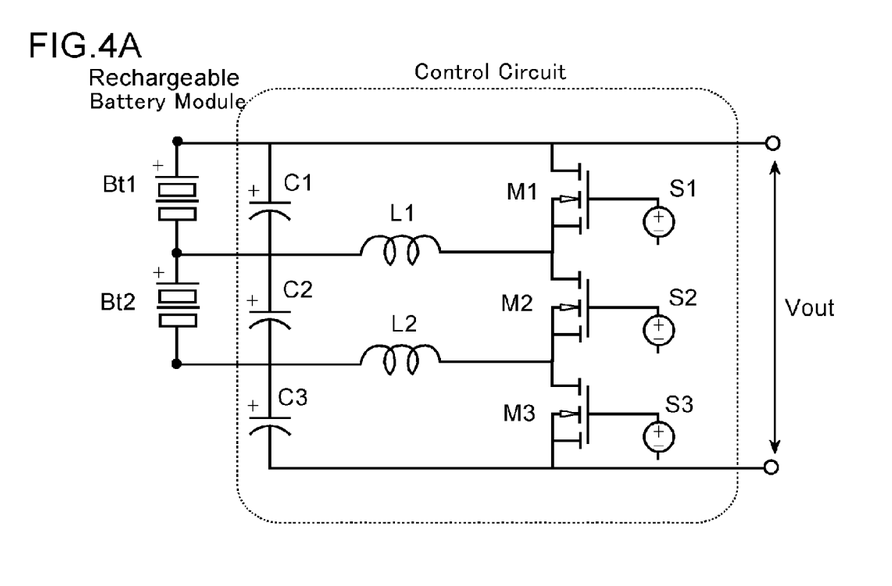
FIG. 4A is a circuit configuration diagram of the power generation operating point control circuit device according to the present disclosure of FIG. 1A, where rechargeable battery cells are series-connected instead of photovoltaic cells.
Figure 4B:
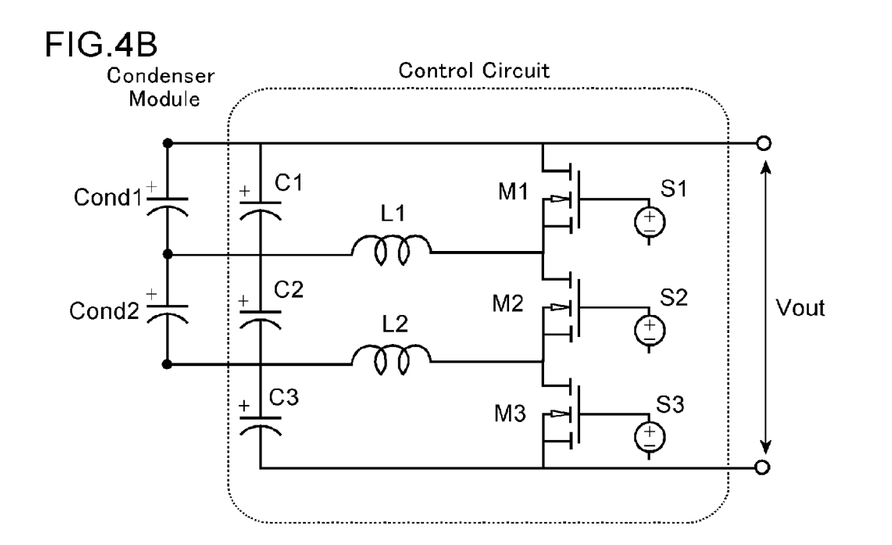
FIG. 4B is a circuit configuration diagram of the power generation operating point control circuit device according to the present disclosure of FIG. 1A, where condenser cells are series-connected instead of photovoltaic cells.
Figure 5A:
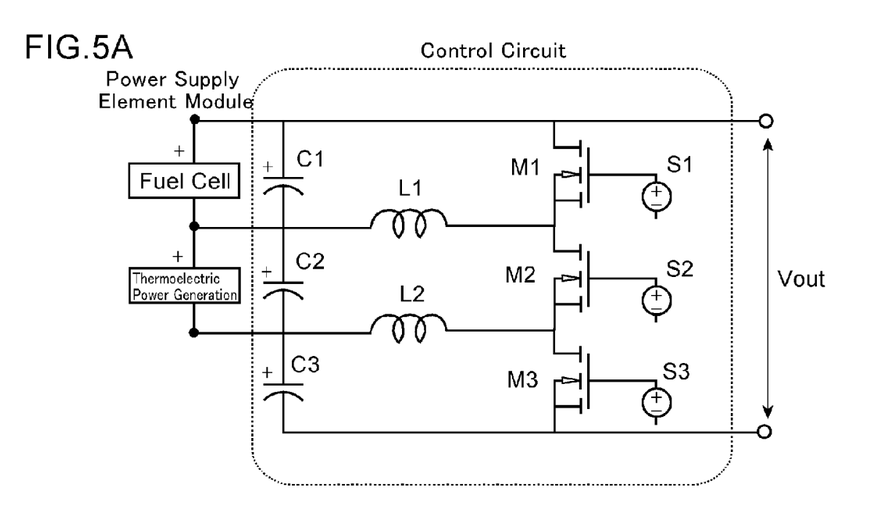
FIG. 5A is a circuit configuration diagram of the power generation operating point control circuit device according to the present disclosure of FIG. 1A, where a fuel cell and a thermoelectric element (thermoelectric power generation) are series-connected instead of photovoltaic cells.
Figure 5B:
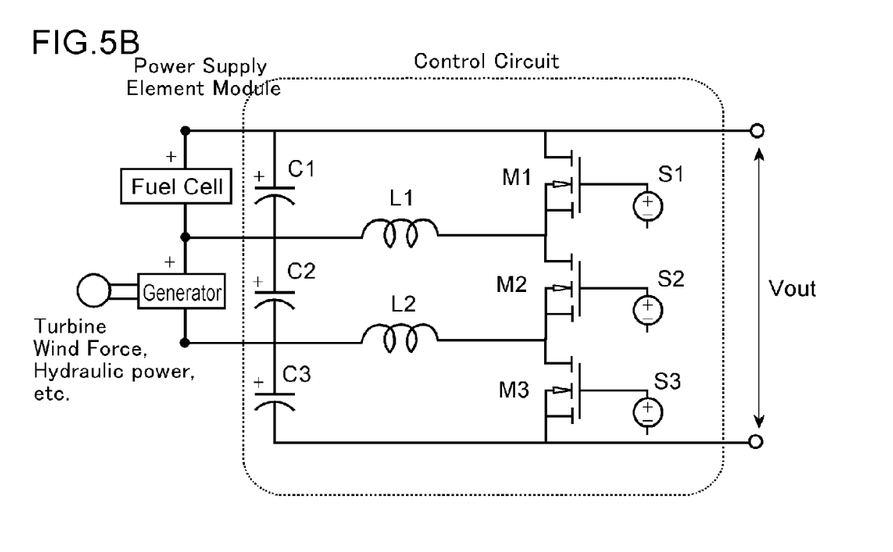
FIG. 5B is a circuit configuration diagram of the power generation operating point control circuit device according to the present disclosure of FIG. 1A, where a fuel cell and an electric generator are series-connected instead of photovoltaic cells.

Parallel Connection of Power Generation Operating Point Control Circuit Device According to the Present Disclosure As illustrated in FIG. 3, a plurality of the power generation operating point control circuit devices according to the present disclosure may be used in a condition that units U1 and U2 are connected in parallel in those output terminals. In this structure of parallel connection, the output voltages of the units U1 and U2 have to be equal to each other, and in the case of the power generation operating point control circuit device according to the present disclosure, as noted, the output voltage of each unit can be set arbitrarily, and therefore, it is advantageous in that no separate pressure boosting means for rendering the output voltages of the units U1 and U2 to be equal to each other.

Application of Power Generation Operating Point Control Circuit Device According to the Present Disclosure to Other Power Supply Elements As illustrated in FIGS. 4A-4B and 5A-5B, the structure of the power generation operating point control circuit device according to the present disclosure may be applied in a case that arbitrary power supply cells, such as chemical cells, condenser cells, fuel cells (those may be solid oxide type fuel cells.), thermoelectric power generation elements, electric generator cells (those may be arbitrary generators with wind force, hydraulic power, tidal power, engine, etc.), are series-connected, other than photovoltaic cells. In a case that the optimal operating voltages of series-connected, power supply cells differ from one another, in accordance with the use of the circuit configuration according to the present disclosure, it becomes possible to operate the cells at the respective optimal operating voltages. Moreover, the structure of the power generation operating point control circuit device according to the present disclosure may be applied when the kinds of series-connected electric sources differ from one another. For example, the structure as illustrated in FIG. 3 that a plurality of units having the circuit configuration according to the present disclosure are connected in parallel may be used in a condition that two or more units in which series-connected power supply cells differ mutually (for example, a unit of series-connected photovoltaic cells and a unit of series-connected rechargeable battery cells (chemical cells)) are connected in parallel as illustrated in FIG. 6.

Figure 6:
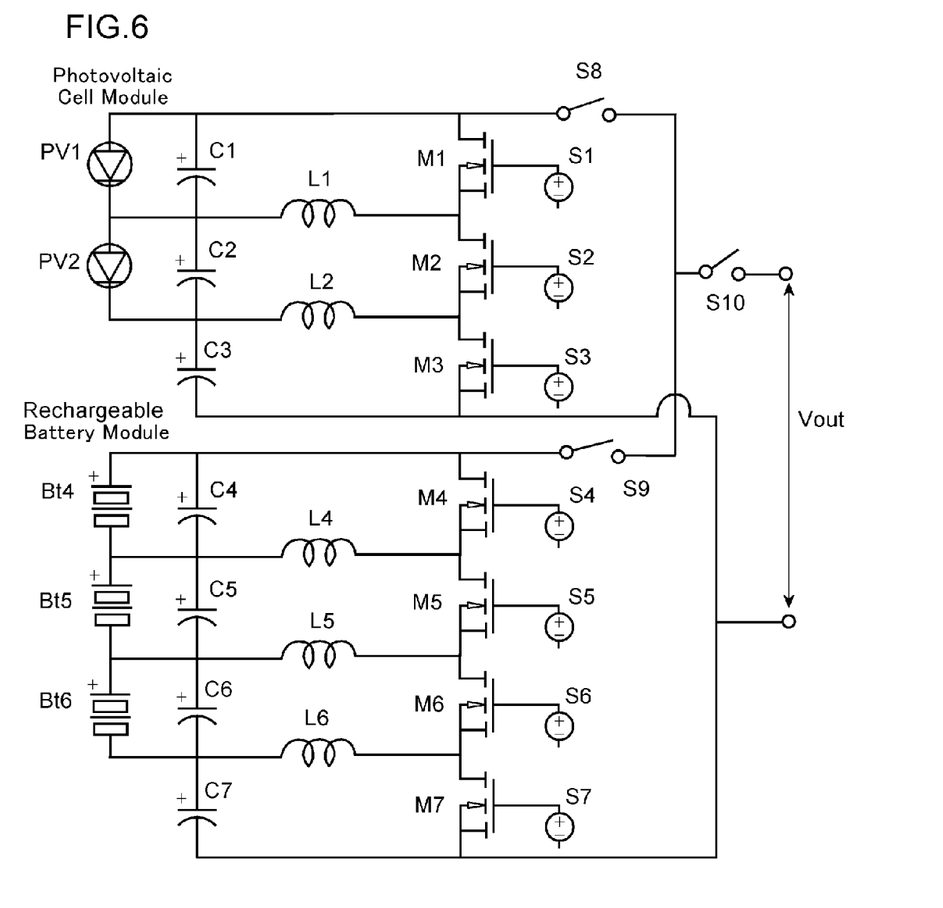
FIG. 6 shows a diagram of a circuit configuration in which two of the circuit configurations (units) shown in FIG. 1A are connected in parallel similarly to FIG. 3, where rechargeable battery cells are series-connected instead of photovoltaic cells in one of the units.

Moreover, in the structure that two or more units in which series-connected power supply cells differ mutually are connected in parallel, switching elements S8, S9 and S10 may be appropriately put on the output terminals of the respective units as illustrated in FIG. 6. In the case of FIG. 6, it also becomes possible to charge the generated electric powers of the photovoltaic cells to the rechargeable batteries, appropriately.

For example, in the operation of the illustrated example, various modes of operations are realized, depending upon the ON/OFF states of the switching elements S8, S9, and S10, as follows:

(a) S8=ON, S9=ON and S10=OFF: A mode of charging electric powers generated by the photovoltaic cells to the rechargeable battery (b) S8=ON, S9=ON, and S10=ON: A mode of outputting the electric power generated by the photovoltaic cells and charging surplus electric power in the rechargeable batteries;

(c) S8=OFF, S9=ON, and S10=ON: A mode of only outputting the electric power from the rechargeable batteries (d) S8=ON, S9=OFF, and S10=ON: A mode of only outputting the electric power from the photovoltaic cells According to this structure, since transfer of energy can be appropriately performed between photovoltaic cells and other electric sources, electric power can be outputted in a condition with appropriate energy efficiency in a system. For example, in an application of photovoltaic cells to an electric vehicle (EV), there is realized a structure that, during the running of the vehicle, electric power generated by photovoltaic cells and rechargeable batteries are used for driving the vehicle, while, in the parking, electric power generated by the photovoltaic cells is not outputted but stored into the rechargeable batteries.

In a series of the above-mentioned operations, it is advantageous in that, in the power generation operating point control circuit device according to the present disclosure, the maximum possible electric power acquirable from those photovoltaic cells or other electric source cells can be used without using a separate booster, etc. even when the output voltage is larger than the total of voltages in a case that all the photovoltaic cells or other electric source cells are optimally operated.

Although the above explanation has been described with respect to embodiments of the present disclosure, it will be apparent for those skilled in the art that various modifications and changes are possible, and that the present disclosure is not limited to the above-illustrated embodiments and may be applied to various devices and apparatus without deviating from the concepts of the present disclosure.

The invention claimed is:

1. An electric power generation operating point control circuit device for two or more series-connected photovoltaic cells, comprising:
    a pair of output terminals,
    two or more electrode connecting terminals connected to respective electrode terminals of two or more photovoltaic cells connected in series between the pair of the output terminals,
    a capacitor connected in parallel to each of the two or more photovoltaic cells through the corresponding electrode connecting terminals between the pair of the output terminals;
    a switching element connected in parallel to each of the two or more photovoltaic cells through a pair of the corresponding electrode connecting terminals and an inductor between the pair of the output terminals, and the switching element selectively making the pair of the corresponding electrode connecting terminals connected thereto electrically conductive with each other;
    an additional capacitor connected in series to the capacitors between the pair of the output terminals, the additional capacitor being connected between one of the electrode connecting terminals at one side end of the two or more series-connected photovoltaic cells and one of the output terminals, or between two of the electrode connecting terminals between two adjoined photovoltaic cells of the two or more series-connected photovoltaic cells; and
    an additional switching element connected in parallel to the additional capacitor and connected in series to the switching elements between the pair of the output terminals;
    wherein the switching elements and the additional switching elements are controlled to operate such that the switching elements and the additional switching elements shut off electrical conduction between the corresponding terminals connected thereto among between the pairs of the electrode connecting terminals, between the one of the electrode connecting terminal and the one of the output terminals and between the two of the electrode connecting terminals in a same predetermined cycle time and in mutually different periods to always establish a condition that either one of the switching elements and the additional switching elements shuts off the electrical conduction between the corresponding terminals connected thereto while the others of the switching elements and the additional switching elements make the corresponding terminals connected thereto electrically conductive with each other.

2. The device of claim 1, wherein a ratio of a time width of each of the switching elements shutting off the electrical conduction between the corresponding pair of the electrode connecting terminals to the predetermined cycle time is a ratio of a generated voltage of the corresponding photovoltaic cell of each of the switching elements to an output voltage between the pair of the output terminals; and, when the output voltage between the pair of the output terminals is higher than a total of the generated voltages of the series-connected photovoltaic cells, a ratio of a time width of the additional switching element shutting off the electrical conduction between the corresponding terminals connected thereto to the predetermined cycle time is adjusted to a ratio of a voltage difference, obtained by deducting the total of the generated voltages of the series-connected photovoltaic cells from the output voltage between the pair of the output terminals, to the output voltage between the pair of the output terminals.

3. The device of claim 2, wherein the output voltage between the pair of the output terminals is a desired voltage, and the ratio of the time width of each of the switching elements shutting off the electrical conduction between the corresponding pair of the electrode connecting terminals to the predetermined cycle time is so adjusted that the generated voltage of the photovoltaic cell corresponding to each of the switching elements will become a voltage at a maximum operating point of the corresponding photovoltaic cell.

4. The device of claim 3, further comprising an adjuster which adjusts the ratio of the time width of each of the switching elements shutting off the electrical conduction between the corresponding pair of the electrode connecting terminals to the predetermined cycle time so that the generated voltage of each of the series-connected photovoltaic cells will become a voltage at the maximum operating point of the each of the photovoltaic cell.

5. A device in which pairs of the output terminals of a plurality of the devices of claim 1 are mutually connected in parallel.

6. The device of claim 1, wherein at least one of the photovoltaic cells is replaced to (a) chemical battery cell(s) or (a) condenser cell(s).

7. A device in which pairs of the output terminals of a plurality of the devices of claim 6 are mutually connected in parallel.

8. An operating point control circuit device for two or more series-connected power supply cells, comprising:
a pair of output terminals,
two or more electrode connecting terminals connected to respective electrode terminals of two or more power supply cells connected in series between the pair of the output terminals,
a capacitor connected in parallel to each of the two or more power supply cells through the corresponding electrode connecting terminals between the pair of the output terminals;
a switching element connected in parallel to each of the two or more power supply cells through a pair of the corresponding electrode connecting terminals and an inductor between the pair of the output terminals, and the switching element selectively making the pair of the corresponding electrode connecting terminals connected thereto electrically conductive with each other;
an additional capacitor connected in series to the capacitors between the pair of the output terminals, the additional capacitor being connected between one of the electrode connecting terminals at one side end of the two or more series-connected power supply cells and one of the output terminals, or between two of the electrode connecting terminals between two adjoined power supply cells of the two or more series-connected power supply cells; and
an additional switching element connected in parallel to the additional capacitor and connected in series to the switching elements between the pair of the output terminals;
wherein the switching elements and the additional switching elements are controlled to operate such that the switching elements and the additional switching elements shut off electrical conduction between the corresponding terminals connected thereto among between the pairs of the electrode connecting terminals, between the one of the electrode connecting terminal and the one of the output terminals and between the two of the electrode connecting terminals in a same predetermined cycle time and in mutually different periods to always establish a condition that either one of the switching elements and the additional switching elements shuts off the electrical conduction between the corresponding terminals connected thereto while the others of the switching elements and the additional switching elements make the corresponding terminals connected thereto electrically conductive with each other.

* * * * *

UNITED STATES PATENT AND TRADEMARK OFFICE
CERTIFICATE OF CORRECTION

PATENT NO. : 9,602,049 B2
APPLICATION NO. : 15/139453
DATED : March 21, 2017
INVENTOR(S) : Shinichi Urabe and Toshihisa Shimizu It is certified that error appears in the above-identified patent and that said Letters Patent is hereby corrected as shown below:

In the Specification

In Column 16, Line 11, equation (6a), delete "VL_pm", and insert --V1_pm--, therefor.

Signed and Sealed this
Twenty-third Day of May, 2017

Michelle K. Lee
*Director of the United States Patent and Trademark Office*